United States Patent
Ryu et al.

(10) Patent No.: US 8,098,994 B2
(45) Date of Patent: Jan. 17, 2012

(54) OPTICAL INTERCONNECTION SYSTEM FOR TRANSMITTING AND RECEIVING A THREE-LEVEL SIGNAL AND METHOD OF OPERATING THE SAME

(75) Inventors: Han-youl Ryu, Hwaseong-si (KR); Sung-dong Suh, Seoul (KR); Kyoung-ho Ha, Seoul (KR); Seong-gu Kim, Pyeongtaek-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 810 days.

(21) Appl. No.: 12/213,151

(22) Filed: Jun. 16, 2008

(65) Prior Publication Data

US 2009/0175630 A1    Jul. 9, 2009

(30) Foreign Application Priority Data

Jan. 9, 2008   (KR) .................. 10-2008-0002639

(51) Int. Cl.
*H04B 10/12* (2006.01)

(52) U.S. Cl. ........ 398/141; 398/140; 398/202; 398/211; 398/185

(58) Field of Classification Search .......... 398/140, 398/135, 164, 183, 185, 188–190, 141, 202, 398/211, 214, 182

See application file for complete search history.

(56) References Cited

U.S. PATENT DOCUMENTS

| | | | | |
|---|---|---|---|---|
| 4,475,212 A | * | 10/1984 | McLean et al. | 375/286 |
| 4,703,471 A | * | 10/1987 | Fitelson et al. | 398/43 |
| 5,008,957 A | * | 4/1991 | Kiyono | 398/186 |
| 5,331,452 A | * | 7/1994 | Smyth et al. | 398/202 |
| 5,510,919 A | * | 4/1996 | Wedding | 398/141 |
| 6,188,494 B1 | * | 2/2001 | Minteer | 398/135 |
| 6,258,858 B1 | * | 7/2001 | Nakajima et al. | 516/73 |
| 6,744,546 B2 | * | 6/2004 | Nakamura et al. | 359/237 |
| 7,110,681 B1 | * | 9/2006 | Mizuochi | 398/183 |
| 7,149,256 B2 | * | 12/2006 | Vrazel et al. | 375/295 |
| 7,352,824 B2 | * | 4/2008 | Vrazel et al. | 375/295 |
| 7,613,399 B2 | * | 11/2009 | Yasumoto et al. | 398/154 |
| 2005/0281562 A1 | * | 12/2005 | Pappalardo et al. | 398/183 |
| 2007/0041731 A1 | * | 2/2007 | Yasumoto et al. | 398/140 |
| 2007/0092265 A1 | * | 4/2007 | Vrazel et al. | 398/189 |
| 2008/0175594 A1 | * | 7/2008 | Bai et al. | 398/140 |
| 2009/0047025 A1 | * | 2/2009 | Hong et al. | 398/135 |
| 2010/0247107 A1 | * | 9/2010 | Sadot et al. | 398/140 |
| 2011/0076026 A1 | * | 3/2011 | Ledentsov et al. | 398/140 |

* cited by examiner

*Primary Examiner* — Kenneth N Vanderpuye
*Assistant Examiner* — Hibret Woldekidan
(74) *Attorney, Agent, or Firm* — Harness, Dickey & Pierce, P.L.C.

(57) ABSTRACT

Provided is an optical interconnection system that transmits and receives a three-level signal. The optical interconnection system includes a first and a second optical interconnection device that transmits and receives a two-level signal, and a synthesizer that outputs a three-level signal by synthesizing signals from the first and second optical interconnection devices. The optical interconnection system may transmit and receive a three-level signal while using an optical interconnection device that interconnects a two-level signal.

10 Claims, 5 Drawing Sheets

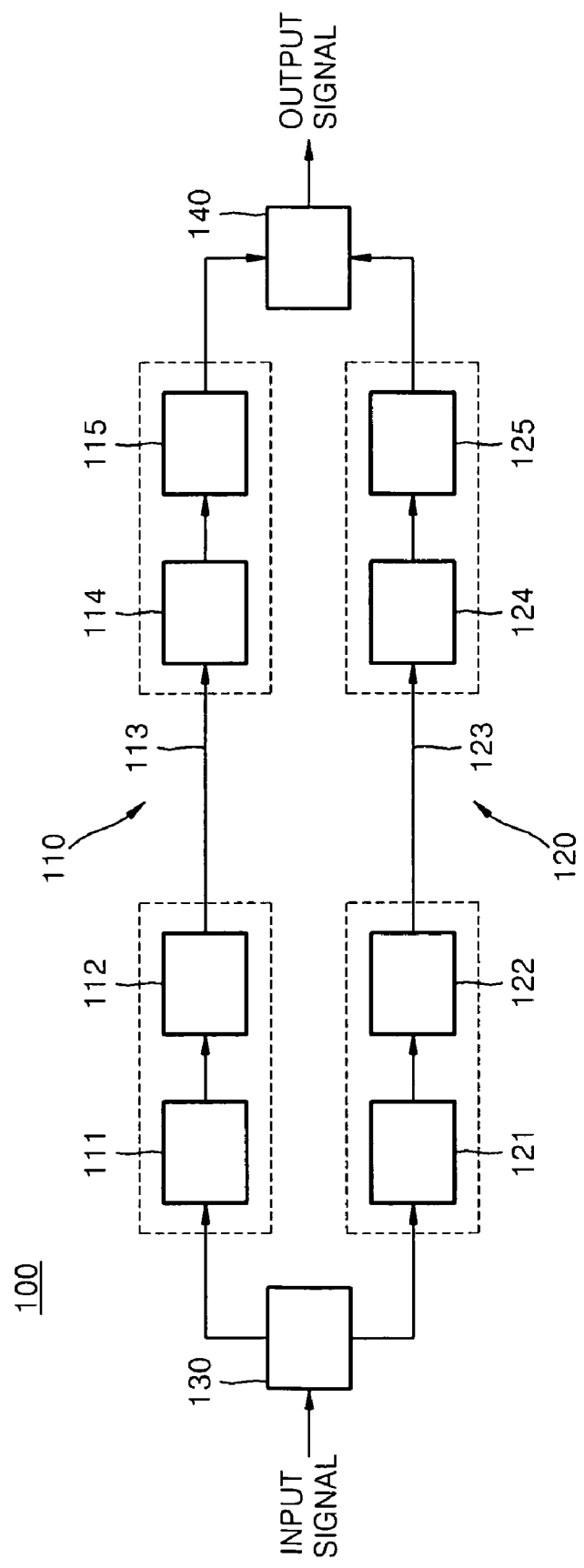

OPTICAL INTERCONNECTION SYSTEM FOR TRANSMITTING AND RECEIVING A THREE-LEVEL SIGNAL AND METHOD OF OPERATING THE SAME

PRIORITY STATEMENT

This application claims the benefit of Korean Patent Application No. 10-2008-0002639, filed on Jan. 9, 2008, in the Korean Intellectual Property Office, the disclosure of which is incorporated herein in its entirety by reference.

BACKGROUND

1. Field

Example embodiments relate to an optical interconnection system that converts a two-level signal into a three-level signal and transmits and receives the three-level signal.

2. Description of the Related Art

In high speed semiconductor devices, there are limitations to the speed of signal transmission due to the use of electrical wires and to large capacity high speed signal transmission due to cross-talk between complex wirings, limited packing density, electromagnetic interference (EMI), etc. To address these problems, optical interconnection techniques using light for transmitting signals between semiconductor devices has drawn attention.

In particular, as the speed of operation of semiconductor devices increases, testing systems for testing the semiconductor devices also require high speed operation. An optical interconnection technique that transmits signals using light between a test head to which a test signal is applied and a device under test (DUT) in semiconductor testing systems has been proposed.

Generally, the signal input/output level of an optical interconnection system includes a high level signal and a low level signal which may correspond to "on" and "off" signals. As such, the optical interconnection system transmits and receives a two level signal.

In addition to the high and low input/output signal levels, semiconductor memory devices further require a reference signal intermediate to the high level signal and the low level signal.

FIG. 1 illustrates a conventional optical interconnection system 10 that transmits a two-level signal. The optical interconnection system 10 may include a transmitting unit 12 that transmits an optical signal, a receiving unit 14 that receives the optical signal, and/or an optical waveguide 16 through which the optical signal is transmitted and received. The transmitting unit 12 outputs the optical signal in response to an electrical input signal, and the receiving unit 14 outputs an electrical signal in response to light received from the optical waveguide 16.

FIG. 2 is a waveform of an output voltage in a conventional optical interconnection system.

Referring to FIG. 2, an optical signal includes a two-level signal, for example, a high level voltage signal $V_H$ and a low level voltage signal $V_L$.

FIG. 3 illustrates a three level signal waveform output from a semiconductor memory according to conventional art.

FIGS. 4A and 4B are waveforms of a voltage output from the conventional optical interconnection system of FIG. 1.

As illustrated in FIG. 3, a signal output from a semiconductor memory may include, in addition to the high level signal and the low level signal, an intermediate level signal, for example, a reference signal $V_{REF}$ which is between the high level signal and the low level signal. That is, there are three signal levels.

Thus, in order to optically interconnect a signal in a semiconductor memory a system that transmits and receives three-level signals is required.

When a signal with a waveform of FIG. 3 is input to an optical interconnection system which operates with conventional two-level signals, an incorrect voltage of the reference signal is output. If a threshold voltage $V_{TH}$ of a signal input to the transmitting unit 12 is higher than the reference voltage $V_{REF}$ of FIG. 3, then, as illustrated in FIG. 4A, the signal $V_{REF}$ input to the transmitting unit 12 is output as a low voltage signal $V_L$ from the receiving unit 14. Thus, an input signal with the waveform of FIG. 3 is output as the waveform of FIG. 4A. The threshold voltage $V_{TH}$ denotes a voltage that differentiates a low voltage signal $V_L$ and a high voltage signal $V_H$ in a two-level optical interconnection system.

FIG. 4B illustrates an output waveform when the threshold voltage $V_{TH}$ is lower than the reference voltage $V_{REF}$. Since the reference voltage $V_{REF}$ is higher than the threshold voltage $V_{TH}$, the reference voltage $V_{REF}$ input to the transmitting unit 12 is output as a high voltage signal $V_H$ from the receiving unit 14.

SUMMARY

Example embodiments are directed to an optical interconnection system that transmits and receives a three-level signal.

According to example embodiments, an optical interconnection system may realize a three-level signal in order to apply a two-level signal optical interconnection system to a three-level signal interconnection system such as a semiconductor memory.

According to an example embodiment, an optical interconnection system that transmits and receives a three-level signal may include first and second optical interconnection devices that transmit and receive a two-level signal; and a synthesizer that may output a three-level signal by synthesizing signals received from the first and second optical interconnection devices.

According to an example embodiment, the first and second optical interconnection devices may each include light emitting unit drivers that receive an electrical signal, light emitting units that emit a light from the light emitting unit drivers, optical waveguides that transmit the light emitted from the light emitting units, light receiving units that receive light transmitted by the optical waveguides and output a current based on the received light and light receiving unit drivers that output a predetermined or desired voltage signal in response to the current received from the light receiving units.

According to an example embodiment, the optical interconnection system may further include a distributor that distributes an externally received electrical signal to the light emitting unit drivers of each of the first and second optical interconnection device.

According to an example embodiment, a signal input from the distributor to the light emitting unit driver of the first optical interconnection device may be output as a high level signal from the first optical interconnection device and a signal input from the distributor to the light emitting unit driver of the second optical interconnection device may be output as a low level signal from the second optical interconnection device.

According to an example embodiment, the distributor may divide an input reference voltage into a first reference voltage higher than a threshold voltage of the light emitting unit driver of the first optical interconnection device and a second reference voltage lower than a threshold voltage of the light emitting unit driver of the second optical interconnection device, and supply the first reference voltage to the first optical interconnection device and supply the second reference voltage to the second optical interconnection device. The light emitting units may be vertical cavity surface emitting lasers (VCSELs) that emit infrared light, and the light receiving units may be photodiodes that detect the infrared light.

According to an example embodiment, a method of operating an optical interconnection system for transmitting and receiving a three-level signal may include transmitting and receiving a two-level signal using a first and second optical interconnection device, providing an output of each of the first and second optical interconnection devices to a synthesizer and synthesizing the output of each of the first and second optical interconnection devices to output a three-level signal.

According to an example embodiment, the method of operation may include inputting an electrical signal to a light emitting unit driver, emitting light from the light emitting unit driver, transmitting the emitted light through an optical waveguide, receiving the transmitted using a light receiving unit, outputting a current based on the received light, outputting a voltage signal in response to the received current.

The method may include distributing an externally received electrical signal to the respective light emitting unit drivers of the first and second optical interconnection devices.

According to an example embodiment, in a method of operation a signal input from the distributor to the light emitting unit driver of the first optical interconnection device may be output as a high level signal and a signal input from the distributor to the light emitting unit driver of the second optical interconnection device may be output as a low level signal.

According to example embodiments, distributing an externally received electrical signal may include dividing the signal into a first reference voltage higher than a threshold voltage of the light emitting unit driver of the first optical interconnection device and a second reference voltage lower than a threshold voltage of the light emitting unit driver of the second optical interconnection device. The first reference voltage may be supplied to the first optical interconnection device and the second reference voltage to the second optical interconnection device.

According to example embodiments, an optical interconnection device may include a light emitting unit driver to which an electrical signal is input, a light emitting unit that emits a light from the light emitting unit driver, an optical waveguide through which the light emitted from the light emitting unit is transmitted, a light receiving unit that receives light transmitted by the optical waveguide and outputs a current based on the received light and a light receiving unit driver that outputs a voltage signal in response to the current received from the light receiving unit.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 5 illustrates a configuration of an optical interconnection system that transmits and receives a three-level signal according to an example embodiment.

DETAILED DESCRIPTION

Figure 1:
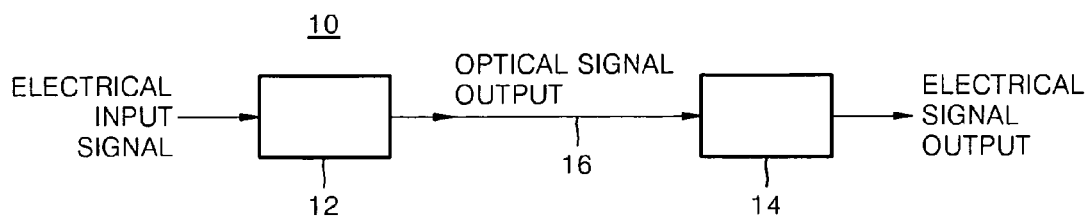
FIG. 1 illustrates a conventional art optical interconnection system that transmits a two-level signal.
Figure 2:
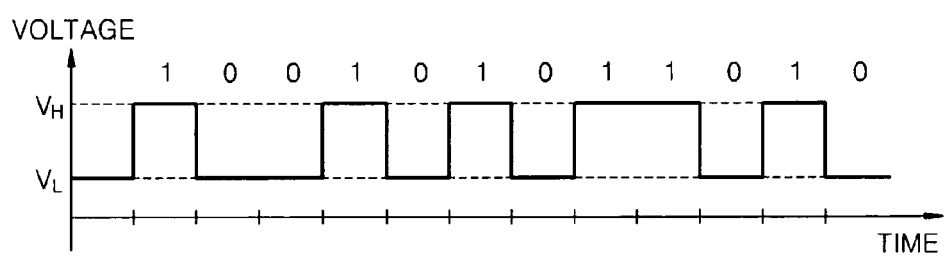
FIG. 2 illustrates a waveform of an output voltage in a conventional art optical interconnection system.
Figure 3:
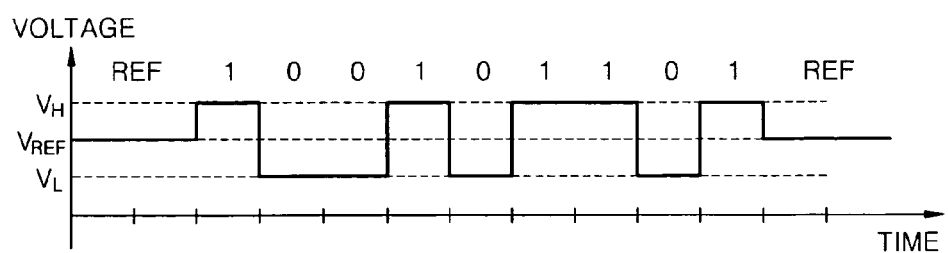
FIG. 3 illustrates a three-level signal waveform output from a semiconductor memory according to conventional art.
Figure 4A:
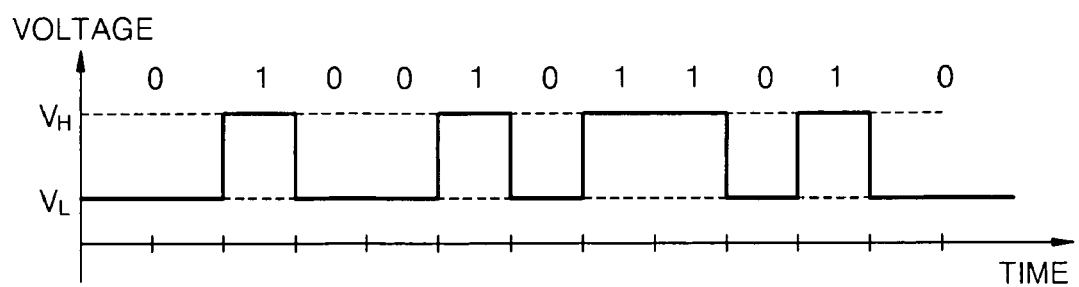
FIGS. 4A and 4B are waveforms of a voltage output from the conventional optical interconnection system of FIG. 1.
Figure 4B:
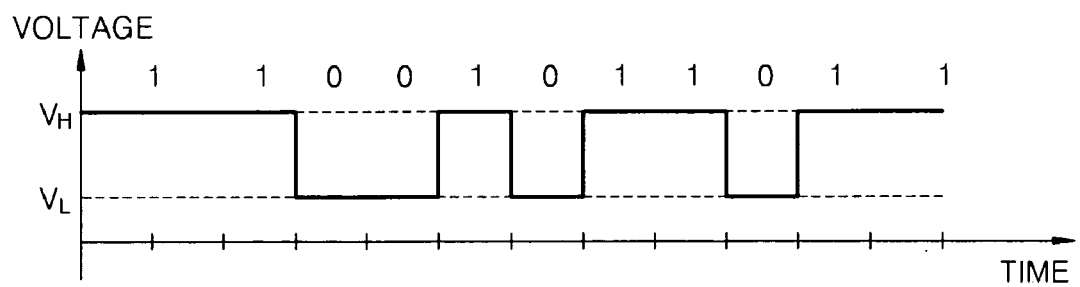

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 5 illustrates a configuration of an optical interconnection system 100 that transmits and receives a three-level signal according to an example embodiment.

The optical interconnection system 100 may include a first optical interconnection device 110 and a second optical interconnection device 120, each of which may transmit and receive a two-level signal. The optical interconnection system 100 may further include a distributor 130 that may distribute an external electrical signal to the first and second optical interconnection devices 110 and 120 and a synthesizer 140 that may synthesize signals output from the first and second optical interconnection devices 110 and 120.

The first and second optical interconnection devices 110 and 120 may respectively include light emitting unit drivers 111 and 121, light emitting units 112 and 122, optical waveguides 113 and 123, light receiving units 114 and 124, and light receiving unit drivers 115 and 125.

The light emitting units 112 and 122 may be laser diodes, for example, vertical cavity surface emitting lasers (VCSELs) and may emit infrared light with a wavelength suitable for optical fiber communication, for example 850 nm.

The light emitting unit drivers 111 and 121 may each receive an output of the distributor 130 and may drive the light emitting units 112 and 122 to generate light in response to the electrical signal.

The distributor 130 may receive the external electrical signal and may divide the input electrical signal into two signals and output the two signals to the light emitting unit drivers 111 and 121.

The optical waveguides 113 and 123 may be, for example, optical fibers or polymer waveguides.

The light receiving units 114 and 124 may be, for example, photodiodes that detect a wavelength of light transmitted from the light emitting units 112 and 122 through the optical waveguides 113 and 123. The light receiving units 114 and 124 may generate a current based on the light from the optical waveguides 113 and 123.

The light receiving unit drivers 115 and 125 may convert the current received from the light receiving units 114 and 124 into electrical signals and output the electrical signals to the synthesizer 140.

The synthesizer 140 may output OUTPUT SIGNAL by synthesizing the electrical signals received from the light receiving unit drivers 115 and 125. For example, the synthesizer 140 may output a three level signal.

Figure 6A:
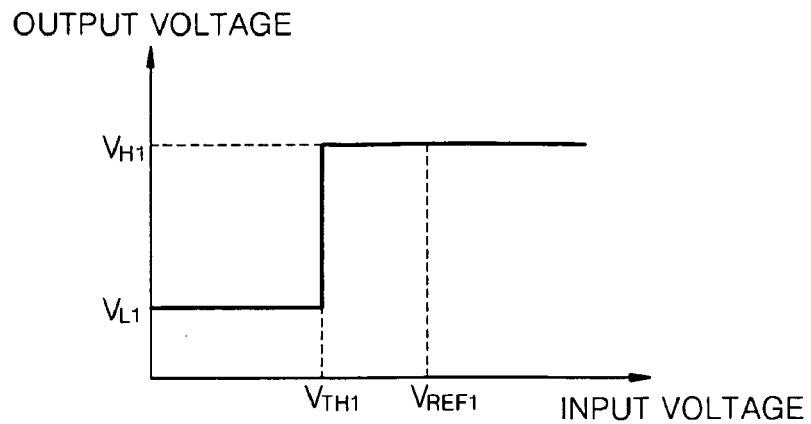
FIGS. 6A through 6C are graphs showing input/output characteristics of an optical interconnection system according to an example embodiment.
Figure 6B:
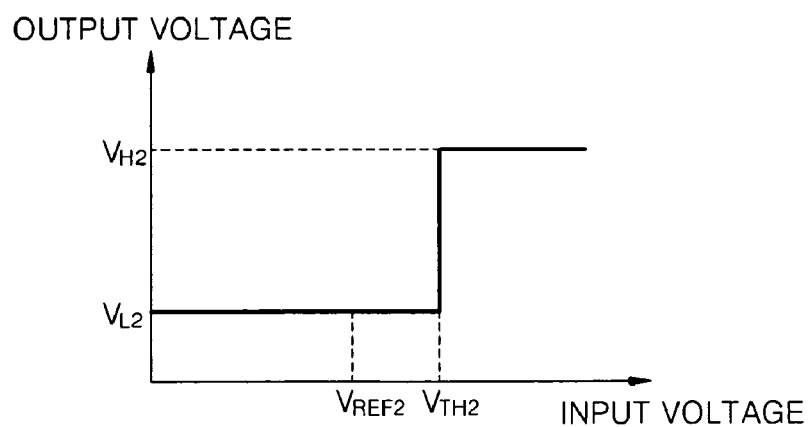
Figure 6C:
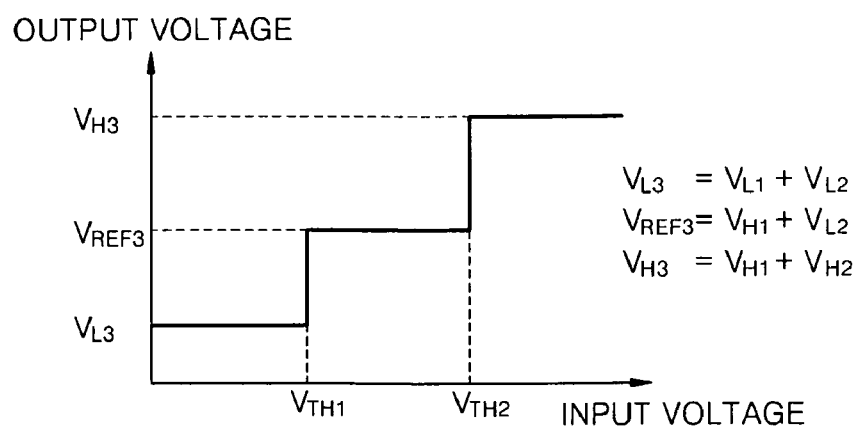

FIGS. 6A through 6C are graphs illustrating input/output characteristics of an optical interconnection system according to an example embodiment.

FIG. 6A is a graph illustrating input/output characteristics of the first optical interconnection device 110. A threshold voltage $V_{TH1}$ of the first optical interconnection device 110 may be set lower than a reference voltage $V_{REF1}$. For example, if the reference voltage $V_{REF1}$ is provided as an input signal, a high voltage signal $V_{H1}$ signal may be output, and if a voltage lower than the threshold voltage $V_{TH1}$ is provided, a low voltage signal $V_{L1}$ may be output signal. Thus, the first optical interconnection device 110 may transmit two-level signals.

FIG. 6B is a graph showing input/output characteristics of the second optical interconnection device 120. A threshold voltage $V_{TH2}$ of the second optical interconnection device 120 may be set higher than the reference voltage $V_{REF2}$. For example, if the reference voltage $V_{REF2}$ is provided as an input signal, a low voltage signal $V_{L2}$ may be output, and if an input signal higher than the threshold voltage $V_{TH2}$ is provided, a high voltage signal $V_{H2}$ may be output. Thus, the second optical interconnection device 120 may also transmit two-level signals.

FIG. 6C is a graph illustrating input/output characteristics of the synthesizer 140. If a signal $V_L$ is input to the distributor 130, the distributor 130 may divide the signal $V_L$ into a low voltage $V_{L1}$ and a low voltage $V_{L2}$ and supply the low voltage $V_{L1}$ to the first optical interconnection device 110 and the low voltage $V_{L2}$ to the second optical interconnection device 120. The low voltages $V_{L1}$ and $V_{L2}$ may be input to the synthesizer 140. An output of the synthesizer 140 may be a signal $V_{L3}$, wherein $V_{L3}=V_{L1}+V_{L2}$. That is, a low voltage signal $V_{L3}$, corresponding to the signal $V_L$, may be output from the synthesizer 140.

If a voltage $V_{REF}$ is input to the distributor 130, the distributor 130 may supply a reference voltage $V_{REF1}$ to the first optical interconnection device 110 and a reference voltage $V_{REF2}$ to the second optical interconnection device 120. The reference voltage $V_{REF1}$ may be higher than the threshold voltage $V_{TH1}$ of the first optical interconnection device 110. A high voltage signal $V_{H1}$ may, therefore, be output from the first optical interconnection device 110. The reference voltage $V_{REF2}$ may be lower than the threshold voltage $V_{TH2}$ of the second optical interconnection device 120. A low voltage signal $V_{L2}$ may, therefore, be output from the second optical interconnection device 120. The output of the synthesizer 140 may be a reference voltage signal $V_{REF3}$, wherein $V_{REF3}=V_{H1}+V_{L2}$.

If a signal $V_H$ is input to the distributor 130, the distributor 130 may supply a high voltage $V_{H1}$ to the first optical interconnection device 110 and a high voltage $V_{H2}$ to the second optical interconnection device 120. The high voltage $V_{H1}$ and the high voltage $V_{H2}$ may be input to the synthesizer 140. An output of the synthesizer 140 may be a signal $V_{H3}$, wherein $V_{H3}=V_{H1}+V_{H2}$. That is, a high voltage signal $V_{H3}$, corresponding to signal $V_H$, may be output from the synthesizer 140. Thus, the optical interconnection system, according to an example embodiment, may receive three-level voltage signals $V_L$, $V_{REF}$, and $V_H$ and may output three-level voltage signals $V_{L3}$, $V_{REF3}$, and $V_{H3}$.

In the example embodiment disclosed above, the voltage signals input to the light emitting unit drivers 111 and 121 from the distributor 130 may be same, and the threshold voltages $V_{TH1}$ and $V_{TH2}$ of the light emitting unit drivers 111 and 121 may be different from each other. However, example embodiments are not limited thereto. For example, if the threshold voltages $V_{TH1}$ and $V_{TH2}$ of the light emitting unit drivers 111 and 121 are same, the distributor 130 may control the reference voltage $V_{REF1}$ output to the light emitting unit driver 111 to be higher than the threshold voltage $V_{TH1}$ and may control the reference voltage $V_{REF2}$ output to the light emitting unit driver 121 to be lower than the threshold voltage $V_{TH2}$, and the same result may be obtained.

FIGS. 7A through 7D are signal waveforms of a three-level signal in the optical interconnection system 100 according to an example embodiment.

Figures 7A, 7B, 7C, 7D:
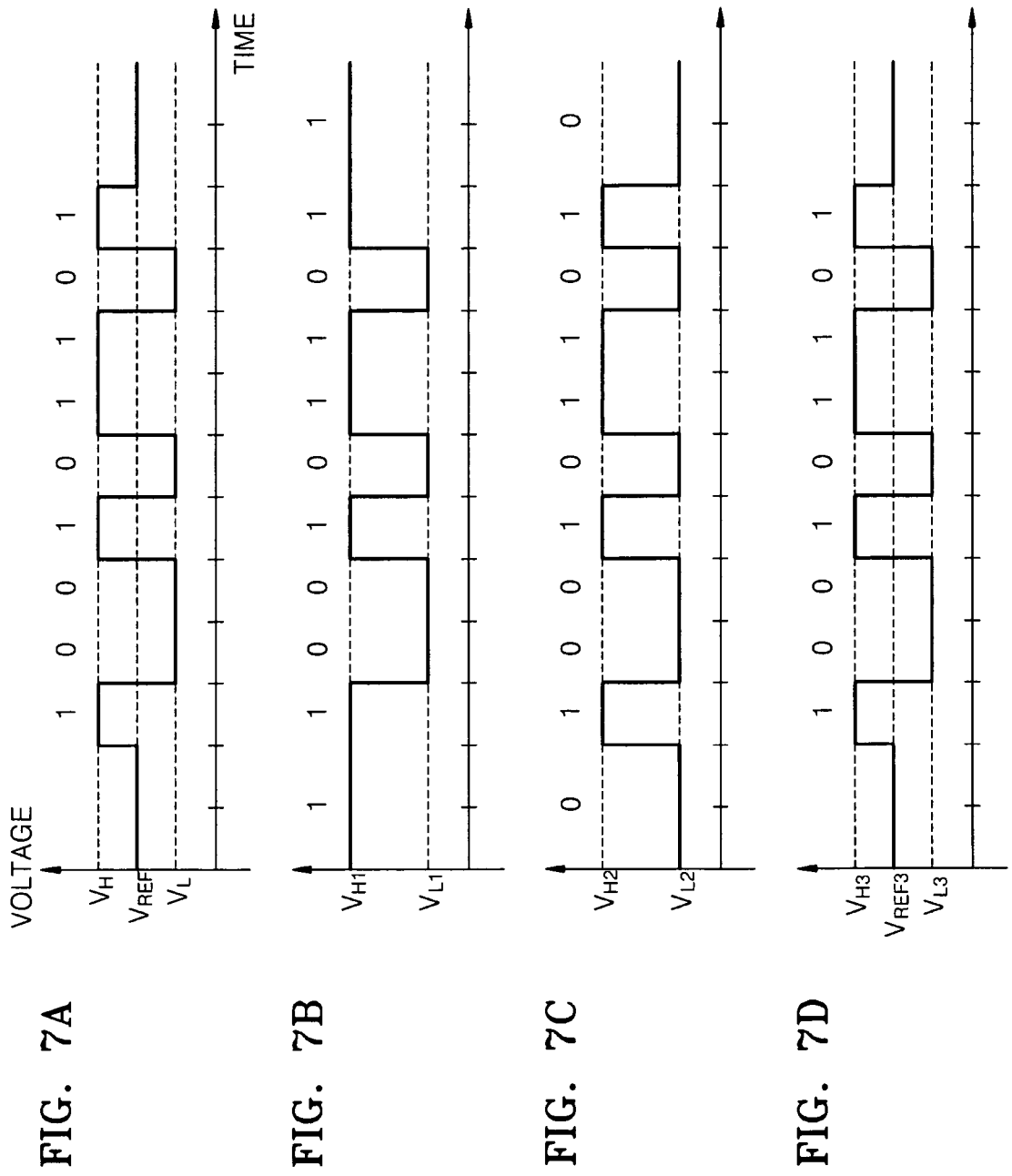
FIGS. 7A through 7D are signal waveforms showing the interconnection of a three-level signal in an optical interconnection system according to an example embodiment.

FIG. 7A is a waveform of a three-level input signal including $V_H$, $V_{REF}$, and $V_L$.

FIG. 7B is a waveform of a two-level signal including $V_{H1}$ and $V_{L1}$ output from the light receiving unit driver 115 of the first optical interconnection device 110. An input reference voltage $V_{REF1}$ may be output as a high level signal $V_{H1}$ from the light receiving unit driver 115.

FIG. 7C is a waveform of a two-level signal including $V_{H2}$ and $V_{L2}$ output from the light receiving unit driver 125 of the second optical interconnection device 120. An input reference voltage $V_{REF2}$ may be output as a low level signal $V_{L2}$ from the light receiving unit driver 125.

FIG. 7D illustrates a waveform, according to an example embodiment, wherein signals of FIGS. 7B and 7C are combined. The waveform may be output from the synthesizer 140 of the optical interconnection system 100. The output signal shows three-level patterns.

In the optical interconnection system, according to example embodiments, a three-level electrical signal may be transmitted and received using an optical interconnection device. Thus, the optical interconnection system, according to example embodiments, may be used in a semiconductor memory system, for example, a memory tester that uses a three-level electrical signal.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An optical interconnection system that transmits and receives a three-level signal, comprising:
    a first optical interconnection device and a second optical interconnection device, each of the first and second optical interconnection devices transmitting and receiving a two-level signal; and
    a synthesizer that outputs a three-level signal by synthesizing signals received from the first and second optical interconnection devices, wherein each of the first and second optical interconnection devices includes,
        a light emitting unit driver to which an electrical signal is input;
        a light emitting unit that emits a light from the light emitting unit driver;
        an optical waveguide through which the light emitted from the light emitting unit is transmitted;
        a light receiving unit that receives light transmitted by the optical waveguide and outputs a current based on the received light; and
        a light receiving unit driver that outputs a voltage signal in response to the current received from the light receiving unit.

2. The optical interconnection system of claim 1, further comprising:
    a distributor that distributes an externally received electrical signal to the light emitting unit driver of the first optical interconnection device and the light emitting unit driver of the second optical interconnection device.

3. The optical interconnection system of claim 2, wherein
    a signal input to the light emitting unit driver of the first optical interconnection device from the distributor is output as a high level signal from the first optical interconnection device; and
    a signal input to the light emitting unit driver of the second optical interconnection device from the distributor is output as a low level signal from the second optical interconnection device.

4. The optical interconnection system of claim 2, wherein the distributor divides the external electrical signal into a first reference voltage and a second reference voltage, and supplies the first reference voltage to the first optical interconnection device and supplies the second reference voltage to the second optical interconnection device.

5. The optical interconnection system of claim 4, wherein the first reference voltage is higher than a threshold voltage of the light emitting unit driver of the first optical interconnection device and the second reference voltage is lower than a threshold voltage of the light emitting unit driver of the second optical interconnection device.

6. The optical interconnection system of claim 1, wherein at least one of the light emitting units of the first and second optical interconnection devices is a vertical cavity surface emitting laser (VCSEL) emitting an infrared light, and at least one of the light receiving units of the first and second optical interconnection devices is a photodiode detecting the infrared light.

7. A method of operating an optical interconnection system for transmitting and receiving a three-level signal, the method comprising:
    transmitting and receiving a two-level signal using a first and a second optical interconnection device;
    providing an output of each of the first and second optical interconnection devices to a synthesizer; and
    synthesizing the output of each of the first and second optical interconnection devices to output a three-level signal, wherein
    the transmitting and receiving includes,
        inputting an electrical signal to a light emitting unit driver,
        emitting light from the light emitting unit driver,
        transmitting the emitted light through an optical waveguide, and
        receiving the transmitted light using a light receiving unit, and
    the providing includes,
        outputting a current based on the received light, and
        outputting a voltage signal in response to the received current.

8. The method of claim 7, further comprising:

distributing an externally received electrical signal to the respective light emitting unit drivers of the first and second optical interconnection device.

9. The method according to claim 8, wherein the electrical signal distributed to the light emitting unit driver of the first optical interconnection device is output as a high level signal; and the electrical signal distributed to the light emitting unit driver of the second optical interconnection device is output as a low level signal.

10. The method according to claim 8, wherein distributing includes, dividing the external electrical signal into a first reference voltage higher than a threshold voltage of the light emitting unit driver of the first optical interconnection device and a second reference voltage lower than a threshold voltage of the light emitting unit driver of the second optical interconnection device, and supplying the first reference voltage to the first optical interconnection device and the second reference voltage to the second optical interconnection device.

* * * * *